United States Patent [19]

Cosyns et al.

[11] 4,225,461

[45] Sep. 30, 1980

[54] PROCESS FOR MANUFACTURING A GROUP VIII NOBLE METAL CATALYST OF IMPROVED RESISTANCE TO SULFUR, AND ITS USE FOR HYDROGENATING AROMATIC HYDROCARBONS

[75] Inventors: Jean Cosyns, Maule; Marc Gremillon, Paris, both of France

[73] Assignee: Institut Francais du Petrole, Rueil-Malmaison, France

[21] Appl. No.: 211

[22] Filed: Jan. 2, 1979

[30] Foreign Application Priority Data

Jan. 2, 1978 [FR] France ................................ 78 00179

[51] Int. Cl.$^2$ ............................................. B01J 27/02
[52] U.S. Cl. .................................................... 252/439
[58] Field of Search ......................................... 252/439

[56] References Cited

U.S. PATENT DOCUMENTS

| | | | |
|---|---|---|---|
| 3,542,694 | 11/1970 | Schwettmann | 252/430 |
| 3,859,204 | 1/1975 | Brunn et al. | 208/216 R |
| 3,915,894 | 10/1975 | Clements et al. | 252/439 |
| 3,954,601 | 5/1976 | Cosyns et al. | 208/143 |
| 4,012,337 | 3/1977 | Mitchell | 252/439 |
| 4,048,058 | 9/1977 | Petersen et al. | 252/439 X |
| 4,148,758 | 4/1979 | Eberly | 252/439 X |
| 4,149,991 | 4/1979 | Eberly | 252/439 X |
| 4,151,115 | 4/1979 | Eberly | 252/439 X |
| 4,155,879 | 5/1979 | Minoun et al. | 252/440 |

*Primary Examiner*—Delbert E. Gantz
*Assistant Examiner*—William G. Wright
*Attorney, Agent, or Firm*—Millen & White

[57] ABSTRACT

Noble metal catalyst of improved resistance to sulfur compounds, obtained by subjecting a catalyst containing a noble metal from group VIII or a compound thereof, a halogen and a carrier, to a first treatment with an inert gas such as nitrogen at 100°–600° C. and to a second treatment with a hydrocarbon material containing at least one sulfur compound, such as an alkyl sulfide, an alkyldisulfide or a thiophenic compound, in an inert gas atmosphere at 50°–400° C.

12 Claims, No Drawings

PROCESS FOR MANUFACTURING A GROUP VIII NOBLE METAL CATALYST OF IMPROVED RESISTANCE TO SULFUR, AND ITS USE FOR HYDROGENATING AROMATIC HYDROCARBONS

This invention relates to the manufacture of an improved catalyst, particularly useful for hydrogenating aromatic hydrocarbons in oil cuts, in the presence of sulfur-containing impurities.

An important application of this invention consists of hydrogenating the aromatic hydrocarbons present in certain oil cuts, such for example as white spirit, of common use in various industries such as those of paints, rubber, solvents for agriculture etc.

Another very important application consists in hydrogenating aromatic hydrocarbons contained in kerosene cuts used as fuel, in order to improve their "smoke point". This empirical index is, in fact, proportional to the hydrogen/carbon ratio of the hydrocarbon or oil cut. To this ratio is directly related the combustion heat which will be the higher as the aromatics are the more hydrogenated. This quality is particularly useful for fuels such as jet fuels whose demand is always increasing and whose specification on the maximal aromatic content are liable to be still more severe as soon as supersonic transport becomes effective.

The catalysts already known may be classified in two categories which each suffer from a number of disadvantages.

The first category of catalysts comprises non-noble metals of group VIII associated with metals of group VI A, in the sulfurized state. These catalysts simultaneously effect hydrodesulfurization of the charge and, to some extent, hydrogenation of the aromatics therein. However, in spite of the use of high pressures and temperatures, for example 400° C. and 80 kg/cm$^2$, the residual contents of aromatics are generally still high and do not provide for the production of sufficiently dearomatized solvents.

The second category of catalysts makes use of metals from group VIII acting in a metal state. This category includes nickel catalysts and noble metal catalysts such as platinum catalysts.

All these catalysts have the disadvantage that they deactivate in the presence of the sulfur compounds which are naturally present in the oil cuts. It is accordingly necessary to preliminarily desulfurize the charges so as to decrease their sulfur content to values which, in most cases, do not exceed 10 ppm by weight. Certain processes, for example that described in the U.S. Pat. No. 3,269,939, claim the treatment of charges containing up to 300 ppm by weight of sulfur, by making use, in particular, of platinum deposited on alumina-silica. However, the use of this carrier, which results in a certain resistance of the catalyst to sulfur, generates cracking which is largely detrimental to the yield of the operation.

Before use, the catalysts are generally treated with hydrogen along (in particular for reducing the oxides of the catalyst metals), or with a mixture of hydrogen and hydrogen sulfide (in particular to sulfurize the metal oxides). In some cases, this presulfurization is directly performed by adding sulfur-containing compounds to the hydrocarbon charge, which is then fed to the reactor under pressure and hydrogen stream.

This technique never results in very active catalysts for hydrogenating aromatics in the presence of sulfur compounds. Conversely, according to the present invention, it is surprisingly possible to obtain catalysts for hydrogenating aromatic hydrocarbons which are particularly efficient even in the presence of sulfur impurities, by pretreating a catalyst comprising a noble metal and halogen in two successive steps:

1. There is first passed over the catalyst a stream of inert gas at a temperature from 100° to 600° C. and preferably from 200° to 400° C. The flow rate of this gas is preferably from 10 to 1000 liters per liter of catalyst and per hour.

2. The catalyst is thereafter contacted with at least one hydrocarbon containing at least one sulfur compound, in an atmosphere of inert gas and at a temperature advantageously from 50° to 400° C. and preferably from 100° to 350° C. The operation is advantageously conducted with a hydrocarbon stream, said hydrocarbon stream consisting advantageously of the treated charge, optionally enriched with sulfur compounds.

The catalyst is then ready for use; it suffices to replace the inert gas with hydrogen to hydrogenate the hydrocarbons charge under the desired conditions.

The catalyst subjected to the treatment according to the invention comprises one or more noble metals from group VIII as well as halogen, preferably fluorine and/or chlorine, deposited on/or incorporated to a carrier. The carrier is preferably alumina having a specific surface from 50 to 500 m$^2$/g. Its total pore volume is advantageously from 0.1 to 1 cc/g. The noble metals are, for example, platinum, iridium, rhodium and/or ruthenium and preferably platinum and/or iridium.

The noble metal content may range from 0.05 to 3% by weight with respect to the carrier.

The halogen amount may range, for example, from 0.5 to 15% by weight with respect to the carrier. The manufacture of these catalysts may be conducted in a known manner, for example by introducing the noble metals from aqueous solutions of their salts or compounds such as hexachloroplatinic acid, hexachloroiridic acid, etc. and introducing chlorine and fluorine, preferably from the corresponding acid halides. The catalyst is then dried and roasted (heated) under known conditions, so as to remove the impregnation water as well as that absorbed on the carrier surface. Said heating is generally performed at 300°–600° C. for 1–15 hours in the presence of air or of a free oxygen-containing gas.

The so-prepared catalyst is then subjected, preferably directly in the hydrogenation unit, to a pretreatment in two steps as above described. The inert gas used in the first step is commonly nitrogen or any other gas substantially inert with respect to the noble metal and which can be admixed with air without danger, for example argon or another rare gas. The presence of hydrogen is excluded. In an embodiment of the invention, it is possible, at the beginning of the first step, to partially or totally replace the inert gas with a gas containing free oxygen, for example air. However, for obvious safety reasons, oxygen has to be removed by scavenging with an inert gas before introducing the hydrocarbon phase. The duration of the first step is for example, from 0.5 to 15 hours, these values being not limitative.

The second step may be performed with a hydrocarbon stream, for example the charge to be treated, comprising at least one sulfur compound whose content, expressed by weight of sulfur, is advantageously from 50 to 1000 ppm. The sulfur compound is preferably an alkyl sulfide, an alkyl disulfide or a thiophenic compound. Less preferred other compounds are mercaptans, carbon disulfide and/or hydrogen sulfide. Examples of such sulfur compounds are dimethylsulfide, diethylsulfide, dimethyldisulfide, thiophene, benzothiophene, dibenzothiophene, ethylmercaptan, butylmercaptan, carbon disulfide, and hydrogen sulfide.

The volume of liquid hydrocarbons containing one or more sulfur compounds is preferably at leasst equal to the catalyst volume, for example 1 to 20 times or more, preferably 2 to 5 times this volume.

The treatment is performed in an atmosphere of inert gas, under a gas pressure preferably from 1 to 100 bars, at a flow rate preferably from 10 to 1000 liters of gas per liter of catalyst and per hour. During this treatment, the pressure is preferably sufficient to maintain the hydrocarbons in the liquid phase.

The inert gas may thereafter be replaced with hydrogen while continuing to introduce the sulfur-containing charge. The gas and liquid flow rates, the pressures and temperatures are adjusted to the desired hydrogenation conditions.

The substance to be hydrogenated is, for example, a pure aromatic hydrocarbon or an oil cut containing at least one aromatic hydrocarbon, such as a light solvent (boiling in the range from 40° to 150° C.), while spirit, kerosene or light gas oil whose final distillation point may reach 300° C. The sulfur content (as sulfur compounds) of these charges may reach 3000 ppm by weight, for example it may range from 50 to 3000 ppm.

The operating conditions are obviously dependent on the nature of the treated charge, i.e. the nature of the aromatic hydrocarbon to be hydrogenated as well as its sulfur content.

The usual conditions are as follows:
Temperature: 200° to 350° C.
Pressure: 5 to 100 kg/cm$^2$
Ratio H$_2$/charge: 100 to 1500 liters (NTP, i.e. under normal temperature and pressure)/liter of hydrocarbon liquid charge.
Space velocity VVH=0.5 to 10 liters of hydrocarbon liquid charge per hour and liter of catalyst.

The following non limitative examples illustrate the present invention.

EXAMPLE 1

Accordig to this example, a series of catalysts are pretreated, either conventionally or according to the technique described in the present application. Each of nitrogen and hydrogen contains about 10 ppm by weight of water.

The carrier consists of transition alumina of the cubic gamma type, having a specific surface of 200 m$^2$/g, in the form of small balls of a 1.5 to 2.5 mm diameter.

A first catalyst (C$_1$Cl) is prepared by impregnating alumina with an aqueous dilute solution of hexachloroplatinic acid and hydrochloric acid, at concentrations corresponding respectively to 0.6 part by weight of platinum and 2 parts by weight of chlorine per 100 parts by weight of dry alumina. The alumina is maintained in the impregnating solution up to the complete absorption of platinum and chlorine. The catalyst is then dried at 120° C., then roasted at 530° C. in air for 20 hours. It contains 0.6% by weight of platinum and 2% by weight of chlorine.

A second catalyst (C$_2$F) is prepared in the same manner as C$_1$Cl and with the same proportion of Pt but with the addition of hydrofluoric acid, instead of hydrochloric acid, so as to introduce 0.6% by weight of platinum and 1.5% by weight of fluorine into the catalyst.

The catalysts are then placed in turn in a unit for hydrogenation under pressure.

In a first series of experiments, the two catalysts are first maintained at 450° C. in a hydrogen stream at atmospheric pressure for 15 hours.

In a second series of experiments, the two catalysts are pretreated according to the process of the present invention, in the following manner:

The catalyst is first treated for 8 hours at 300° C. with a nitrogen stream of 100 liters per liter of catalyst and per hour under a pressure of 1 bar. Then, the temperature is lowered to 250° C., the nitrogen pressure is brought to 10 bars and the charge to be treated, containing 400 ppm of sulfur in the form of dibenzothiophene, is introduced. When an amount of charge corresponding to 5 times the volume of the catalyst has been introduced, nitrogen is progressively replaced with hydrogen and the operating conditions are adjusted to the following values:

Total pressure: 45 kg/cm$^2$
Space velocity: 2 vol/vol/hour
Temperature: 300° C.
H$_2$/liquid charge: 350 liters/liter NTP The treated charge is a straight-run oil cut of the white spirit type, having the following characteristics:
Distillation range ASTM: 152°–200° C.
Specific gravity at 15° C.: 0.778
Aromatic hydrocarbon content: 15% by weight
Sulfur content: 400 ppm by weight (as sulfur-containing compounds)

The results obtained are reported in Table I below.

TABLE 1

| CATA-LYSTS | PRETREATMENT MODE | % b.w. of aromatic hydrocarbons in the product after: | | | | |
|---|---|---|---|---|---|---|
| | | 2 h | 10 h | 50 h | 100 h | 200 h |
| C$_1$Cl | H$_2$450° C.* | 0.3 | 11 | 14 | — | — |
| C$_1$Cl | according to the invention | 0.5 | 0.6 | 0.9 | 1.1 | 1.0 |
| C$_2$F | H$_2$450° C. | 0.4 | 10 | 12 | — | — |
| C$_2$F | According to the invention | 0.5 | 0.5 | 0.8 | 0.9 | 0.9 |

*A pretreatment with hydrogen at 300° C., instead of 450° C., has given substantially the same results (short life time of the catalyst).

The sulfur content of the hydrogenated product is always lower than 5 ppm by weight. The yield of liquid product is in all cases of about 100% by weight. It is observed from this table that only the catalysts prepared according to the invention exhibit a stable activity over a long time. The catalysts used in the conventional manner, on the contrary, quickly deactivate.

EXAMPLE 2

In this example, the catalyst is prepared in a manner similar to that of catalyst C$_2$F. The same metal and fluorine are deposited in the same proportions but hexachloroplatinic acid is replaced with hexachloroiridic acid. There is thus obtained a catalyst containing 0.6% by weight of iridium and 1.5% by weight of fluorine, the remaining part consisting of the alumina used as carrier. The catalyst is used according to the invention in the manner described in example 1. The charge to be treated and the operating conditions are the same as in example 1.

The results obtained are summarized in the following Table:

TABLE II

| HOURS OF RUN | % AROMATIC HYDROCARBONS IN THE PRODUCT |
|---|---|
| 5 | 0.6 |
| 10 | 0.6 |
| 50 | 0.8 |
| 100 | 1.2 |
| 200 | 1.1 |

The sulfur content of the hydrogenated material is always smaller than 5 ppm by weight. It is apparent that this catalyst prepared according to the invention retains an excellent activity in the presence of the sulfur compounds.

The yield by weight is close to 100%.

EXAMPLE 3

This example concerns the treatment of an aircraft kerosene, obtained by straight run distillation, whose smoke point is to be improved by reducing its aromatic hydrocarbons content.

The characteristics of this kerosene are as follows:
$d_4^{15}$: 0.821
Sulfur ppm by weight: 329 (as sulfur compounds)
Aromatics: 19% by volume (AFNOR MO 7 024)
Smoke point: 18 mm (AFNOR MO 7 028)
ASTM distillation:
  Initial point: 164° C.
  50% point: 204.5° C.
  Final point: 244.5° C.

It is desired to obtain a product whose smoke point is higher than 23 mm, which corresponds approximately to an aromatic hydrocarbon content lower than 10% by volume.

The operating conditions are as follows:
Total pressure: 50 kg/cm$^2$
Temperature: 300° C.
H$_2$/charge: 350 liters/liter NTP
ppH: 2 kg of charge per kg of catalyst and per hour.

The catalyst C$_2$F is used in accordance with the invention, as described in example 1. The results are summarized in the following Table:

TABLE III

| OPERATION TIME IN HOURS | 50 | 100 | 500 | 1000 | 2000 |
|---|---|---|---|---|---|
| Smoke point in mm | 28 | 27.5 | 27 | 26.5 | 27 |
| % Residual aromatics by vol. | 2.5 | 4.7 | 4.1 | 4.8 | 4.7 |
| S content (ppm by weight) | 3 | 2.5 | 2.5 | 3 | 3 |
| Yield in % by weight | — | 99.95 (1) | — | — | 99.98 (2) |

(1) average for 100 hours
(2) average for 2000 hours

It is apparent that the catalyst used according to the invention still provides after a very long time an excellent kerosene whose aromatics content is lower than that of the specification and this with a yield substantially equal to the theoretical one.

EXAMPLE 4

In this example, a catalyst containing 0.3% of platinum, 0.6% of iridium and 2% by weight of chlorine is prepared. These three elements are simultaneously deposited onto the carrier from hexachloroplatinic acid and hexachloroiridic acid according to the technique described in example 1.

The operation is conducted according to the invention as described in example 1.

The charge to be treated as well as the process conditions are the same as those described in example 1.

The results are reported in Table IV.

TABLE IV

| HOURS OF RUN | % AROMATICS IN THE PRODUCT |
|---|---|
| 5 | 0.6 |
| 10 | 0.7 |
| 50 | 0.9 |
| 100 | 1.1 |
| 200 | 1.1 |

The sulfur content in the hydrogenated product is here also lower than 4 ppm and it is observed that an excellent activity of the catalyst is maintained in the presence of the sulfur compounds of the charge. The yield by weight in this case is also close to 100%.

Although the mechanism of the invention is not well known, it seems that the first step of the process has at least two effects: drying of the catalyst when the latter still contains moisture resulting from its preparation or from the absorption of the atmospheric moisture, and removal of oxygen when the catalyst has been previously contacted with said gas. The duration of the first step treatment is accordingly preferably chosen the longer as the oxygen and moisture content of the catalyst is the higher and the inert gas flow rate is the lower.

The inert gas used in the first step is a relatively dry gas i.e. a gas preferably containing less than 0.1% by weight of water and, still more advantageously, less than 100 ppm by weight of water.

What we claim is:

1. In a process for manufacturing a noble metal catalyst, which comprises the steps of admixing a noble metal from group VIII or a compound of such metal and a halogen with a carrier to form a catalytic composition, and roasting said catalytic composition; the improvement which comprises the further steps of (a) treating the resultant roasted composition with a substantially hydrogen-free inert gas at a temperature of from 100° to 600° C., and then (b) treating the resultant composition from step (a) with a mixture of at least one hydrocarbon and at least one sulfur compound, in a substantially hydrogen-free inert gas environment and at a temperature of from 50° to 400° C.; whereby a catalyst having improved resistance to sulfur is obtained.

2. A process according to claim 1, wherein the inert gas is nitrogen.

3. A process according to claim 1, wherein the catalyst contains from 0.05 to 3% by weight of noble metal and from 0.5 to 15% by weight of halogen with respect to the carrier.

4. A process according to claim 1, wherein the inert gas is introduced at a flow rate of 10 to 1000 liters per liter of catalyst during step (a), this step being performed for 0.5 to 15 hours and the temperature being from 200° to 400° C.

5. A process according to claim 1, wherein the hydrocarbon mixture, in step (b), contains 50 to 1000 ppm of sulfur compounds, expressed by weight of sulfur and is used in a proportion corresponding to 1 to 20 times the catalyst volume, the inert gas pressure being from 1 to 100 bars and the hourly feed rate of the inert gas being from 10 to 1000 liters per liter of catalyst.

6. A process according to claim 1, wherein the sulfur compound is an alkyl sulfide, an alkyl disulfide or a thiophenic compound.

7. A process according to claim 1, wherein said roasting is effected at 300°–600° C., in an atmosphere containing free oxygen.

8. A process according to claim 1, wherein the mixture of hydrocarbon and sulfur compound of step (b) contains 50 to 1000 ppm, by weight of sulfur, of sulfur compound.

9. A process according to claim 1, wherein the mixture of hydrocarbon and sulfur compound is maintained in the liquid phase in step (b).

10. A process according to claim 1, wherein the mixture of hydrocarbon and sulfur compound of step (b) is an oil cut comprising at least one aromatic hydrocarbon and 50 to 3000 ppm of sulfur compounds, by weight of sulfur.

11. A process according to claim 1, wherein the inert gas of step (a) contains less than 100 ppm by weight of water.

12. A process according to claim 1, wherein the carrier is alumina having a specific surface from 50 to 500 $m^2/g$ and a pore volume from 0.1 to 1 cc/g.

* * * * *